United States Patent
Krneta et al.

(10) Patent No.: US 12,217,090 B2
(45) Date of Patent: Feb. 4, 2025

(54) ON-DEMAND CO-PROCESSING RESOURCES FOR QUANTUM COMPUTING

(71) Applicant: Amazon Technologies, Inc., Seattle, WA (US)

(72) Inventors: Milan Krneta, Seattle, WA (US); Eric M Kessler, New Rochelle, WA (US); Christian Bruun Madsen, Longmont, CO (US)

(73) Assignee: Amazon Technologies, Inc., Seattle, WA (US)

( * ) Notice: Subject to any disclaimer, the term of this patent is extended or adjusted under 35 U.S.C. 154(b) by 484 days.

(21) Appl. No.: 17/525,716

(22) Filed: Nov. 12, 2021

(65) Prior Publication Data

US 2023/0153155 A1   May 18, 2023

(51) Int. Cl.
*G06F 9/50*   (2006.01)

(52) U.S. Cl.
CPC .......... *G06F 9/5022* (2013.01); *G06F 9/5044* (2013.01); *G06F 9/5077* (2013.01)

(58) Field of Classification Search
CPC ..... G06F 9/5022; G06F 9/5044; G06F 9/5077
See application file for complete search history.

(56) References Cited

U.S. PATENT DOCUMENTS

| | | | |
|---|---|---|---|
| 5,937,205 A | 8/1999 | Mattson et al. | |
| 6,741,585 B1 | 5/2004 | Munoz et al. | |
| 7,277,872 B2 | 10/2007 | Raussendorf et al. | |
| 7,376,547 B2 | 5/2008 | Meredith | |
| 7,484,091 B2 | 1/2009 | Bade et al. | |

(Continued)

FOREIGN PATENT DOCUMENTS

| | | |
|---|---|---|
| EP | 1701259 | 9/2006 |
| EP | 2557498 | 2/2013 |

(Continued)

OTHER PUBLICATIONS

International Search Report and Written Opinion mailed Aug. 25, 2023 in PCT/US2022/079425, Amazon Technologies, Inc., pp. 1-11.

(Continued)

*Primary Examiner* — Benjamin C Wu
(74) *Attorney, Agent, or Firm* — Alexander A. Knapp; Kowert, Hood, Munyon, Rankin & Goetzel, P.C.

(57) ABSTRACT

An algorithm execution management system of a provider network may receive a request from a user for executing an algorithm using different types of computing resources, including classical computing resources and quantum computing resources. The request may indicate a container that includes the algorithm code and dependencies such as libraries for executing the algorithm. The algorithm execution management system may first determine that the quantum computing resources are available to execute the algorithm, and then cause the classical computing resources to be provisioned. The algorithm execution management system may cause at least one portion of the algorithm to be executed at the classical computing resources using the container indicated by the user, and at least another portion of the algorithm to be executed at the quantum computing resources. The quantum task of the algorithm may be provided a priority during execution of the algorithm for using the quantum computing resources.

20 Claims, 9 Drawing Sheets

(56) References Cited

U.S. PATENT DOCUMENTS

| | | |
|---|---|---|
| 7,529,717 B2 | 5/2009 | Vala et al. |
| 7,876,145 B2 | 1/2011 | Koch |
| 7,996,836 B1 | 8/2011 | McCorkendale et al. |
| 8,032,899 B2 | 10/2011 | Archer et al. |
| 8,095,745 B1 | 1/2012 | Schmidt |
| 8,127,292 B1 | 2/2012 | Dobrovolskiy et al. |
| 8,190,553 B2 | 5/2012 | Routt |
| 8,201,161 B2 | 6/2012 | Challener et al. |
| 8,239,557 B2 | 8/2012 | McCune et al. |
| 8,433,802 B2 | 4/2013 | Head et al. |
| 8,514,868 B2 | 8/2013 | Hill |
| 8,706,798 B1 | 4/2014 | Suchter et al. |
| 8,832,164 B2 | 9/2014 | Allen et al. |
| 9,317,331 B1 | 4/2016 | Koh et al. |
| 9,323,552 B1 | 4/2016 | Adogla et al. |
| 9,361,145 B1 | 6/2016 | Wilson et al. |
| 9,400,499 B2 | 7/2016 | Williams et al. |
| 9,430,280 B1 | 8/2016 | Shih et al. |
| 9,471,880 B2 | 10/2016 | Williams |
| 9,485,323 B1 | 11/2016 | Stickle et al. |
| 9,530,873 B1 | 12/2016 | Carroll et al. |
| 9,537,953 B1 | 1/2017 | Dadashikelayeh et al. |
| 9,660,859 B1 | 5/2017 | Dadashikelayeh et al. |
| 9,774,489 B1 * | 9/2017 | Gupta .................... H04L 41/00 |
| 9,870,273 B2 | 1/2018 | Dadashikelayeh |
| 9,979,694 B2 | 5/2018 | Brandwine et al. |
| 10,043,035 B2 | 8/2018 | LaFever |
| 10,095,537 B1 | 10/2018 | Neogy et al. |
| 10,275,721 B2 | 4/2019 | Dukatz et al. |
| 10,482,413 B2 | 11/2019 | Paterra et al. |
| 10,498,611 B1 | 12/2019 | Kloberdans et al. |
| 10,592,216 B1 * | 3/2020 | Richardson ......... G06F 11/3452 |
| 10,614,371 B2 | 4/2020 | Bishop et al. |
| 10,817,337 B1 * | 10/2020 | Richardson ........... G06F 9/5005 |
| 10,831,519 B2 | 11/2020 | Faulhaber, Jr. |
| 10,997,519 B2 | 5/2021 | Gunnels |
| 11,170,137 B1 * | 11/2021 | Richardson ............. G06F 30/20 |
| 11,175,971 B1 * | 11/2021 | Lee ....................... G06F 9/5044 |
| 11,222,279 B2 | 1/2022 | Gambetta |
| 11,270,220 B1 * | 3/2022 | Richardson ........... G06F 9/5066 |
| 11,526,385 B1 | 12/2022 | Mannar |
| 11,605,016 B2 | 3/2023 | Heckey et al. |
| 11,605,033 B2 | 3/2023 | Bolt et al. |
| 11,650,869 B2 | 5/2023 | Heckey et al. |
| 11,775,855 B2 * | 10/2023 | Richardson ........... G06F 9/5044 718/104 |
| 11,907,092 B2 * | 2/2024 | Krneta .................... G06N 10/00 |
| 12,013,845 B1 * | 6/2024 | Kavali .................... G06N 10/40 |
| 2003/0121028 A1 | 6/2003 | Coury et al. |
| 2003/0169041 A1 | 9/2003 | Coury et al. |
| 2005/0013280 A1 | 1/2005 | Buddhikot et al. |
| 2005/0229151 A1 | 10/2005 | Gupta |
| 2005/0251806 A1 | 11/2005 | Auslander et al. |
| 2006/0224547 A1 | 10/2006 | Ulyanov et al. |
| 2006/0225165 A1 | 10/2006 | Maassen van den Brink et al. |
| 2007/0174227 A1 | 7/2007 | Johnson et al. |
| 2007/0239366 A1 | 10/2007 | Hilton et al. |
| 2007/0294070 A1 | 12/2007 | Yamashita |
| 2008/0244553 A1 | 10/2008 | Cromer et al. |
| 2008/0313430 A1 | 12/2008 | Bunyk |
| 2009/0070402 A1 | 3/2009 | Rose et al. |
| 2010/0070970 A1 | 3/2010 | Hu et al. |
| 2011/0075667 A1 | 3/2011 | Li et al. |
| 2011/0131443 A1 | 6/2011 | Laor et al. |
| 2013/0167123 A1 | 6/2013 | Dura et al. |
| 2013/0179330 A1 | 7/2013 | Quillian |
| 2014/0187427 A1 | 7/2014 | Macready et al. |
| 2014/0208413 A1 | 7/2014 | Grobman et al. |
| 2014/0264288 A1 | 9/2014 | Svore et al. |
| 2015/0160884 A1 | 6/2015 | Scales et al. |
| 2015/0339417 A1 | 11/2015 | Garcia-Ramirez et al. |
| 2016/0026573 A1 | 1/2016 | Jacobs et al. |
| 2016/0077845 A1 | 3/2016 | Earl et al. |
| 2016/0170781 A1 | 6/2016 | Liguori et al. |
| 2016/0170785 A1 | 6/2016 | Liguori et al. |
| 2016/0328253 A1 | 11/2016 | Majumdar |
| 2017/0017894 A1 | 1/2017 | Lanting et al. |
| 2017/0177782 A1 | 6/2017 | Hastings et al. |
| 2017/0194930 A1 | 7/2017 | Wiebe et al. |
| 2017/0223094 A1 | 8/2017 | Johnson et al. |
| 2017/0228483 A1 | 8/2017 | Rigetti et al. |
| 2017/0286858 A1 | 10/2017 | La Cour et al. |
| 2017/0300354 A1 | 10/2017 | Dalal et al. |
| 2017/0357539 A1 | 12/2017 | Dadashikelayeh et al. |
| 2017/0364796 A1 | 12/2017 | Wiebe et al. |
| 2017/0366606 A1 | 12/2017 | Ben-Shaul et al. |
| 2018/0046933 A1 | 2/2018 | La Cour et al. |
| 2018/0107526 A1 | 4/2018 | Dadashikelayeh |
| 2018/0107939 A1 | 4/2018 | Schoennenbeck et al. |
| 2018/0218281 A1 | 8/2018 | Reinhardt |
| 2018/0232649 A1 | 8/2018 | Wiebe et al. |
| 2018/0232653 A1 | 8/2018 | Selvanayagam |
| 2018/0260125 A1 | 9/2018 | Botes et al. |
| 2018/0260731 A1 | 9/2018 | Zeng et al. |
| 2018/0307988 A1 | 10/2018 | Fano et al. |
| 2018/0308000 A1 | 10/2018 | Dukatz et al. |
| 2018/0365585 A1 | 12/2018 | Smith et al. |
| 2018/0373540 A1 | 12/2018 | Bao et al. |
| 2019/0130327 A1 | 5/2019 | Carpenter |
| 2019/0222748 A1 | 7/2019 | Weir |
| 2019/0370679 A1 | 12/2019 | Curtis |
| 2019/0378047 A1 | 12/2019 | Pistoia |
| 2020/0034170 A1 * | 1/2020 | Chen .................... G06F 9/45558 |
| 2020/0042349 A1 | 2/2020 | Jain et al. |
| 2020/0174836 A1 | 6/2020 | Gunnels |
| 2020/0364601 A1 | 11/2020 | Yamazaki |
| 2020/0387822 A1 | 12/2020 | Kilmov |
| 2021/0157662 A1 * | 5/2021 | Heckey ................. G06F 9/5072 |
| 2021/0158199 A1 * | 5/2021 | Heckey ..................... G06F 9/54 |
| 2021/0158425 A1 * | 5/2021 | Kasprowicz ........... G06N 10/00 |
| 2021/0201189 A1 | 7/2021 | Gunnels |
| 2021/0357797 A1 * | 11/2021 | Karalekas ............. G06N 10/80 |
| 2021/0357799 A1 | 11/2021 | Ducore |
| 2022/0051112 A1 | 2/2022 | Wang |
| 2022/0101164 A1 | 3/2022 | Majumdar |
| 2022/0414517 A1 * | 12/2022 | Sete ....................... G06N 10/20 |
| 2023/0047145 A1 | 2/2023 | Alexeev |
| 2023/0110628 A1 * | 4/2023 | Heckey ................. G06F 9/5038 |
| 2023/0153219 A1 * | 5/2023 | Krneta .................... G06N 10/80 709/224 |
| 2023/0188335 A1 * | 6/2023 | Lamas Linares ..... H04L 63/166 713/168 |
| 2024/0112062 A1 * | 4/2024 | Shanmugam Sakthivadivel et al. ....................... G06N 10/20 |

FOREIGN PATENT DOCUMENTS

| | | |
|---|---|---|
| WO | 2015121619 | 8/2015 |
| WO | 2019222748 | 11/2019 |
| WO | 2020047426 A1 | 3/2020 |
| WO | 2020072819 | 4/2020 |
| WO | 2020108993 A1 | 6/2020 |

OTHER PUBLICATIONS

M. Gross, et al., "A Serverless Cloud Integration for Quantum Computing," arXiv preprint arXiv:2107.02007. Jul. 5, 2021, pp. 1-8, Cornell University Library, Ithaca, NY.

U.S. Appl. No. 18/179,771, filed Mar. 7, Derek Bolt, et al.

Rahaman, et al., "A Review on Progress and Prodblems and Qualtum Coputing as a Servce (Qcaas) in the Perspective of Cloud Computing," Global Journal of Computer Science and Technology, 2015, 6pg.

Singh, et al, "The Quantum Way of Cloud Computing," IEEE, 2014, 4 pgs.

Igor L. Markov, et al., "Quantum Supremacy is Both Closer and Farther than It Appears", arXiv:1807.10749v3, Sep. 26, 2048. Pages 1-32.

U.S. Appl. No. 16/196,723, filed Nov. 20, 2018, Anthony Nicholas Liguori, et al.

(56) References Cited

OTHER PUBLICATIONS

Ozgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-2/13/04, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.
Robbert van Renesse, et al, "Chain Replication for Supporting High Throughput and Availability," USENIX Association, OSDI 2004: 6th Symposium on Operating Systems Design and Implementation, pp. 91-104.
Philip A. Bernstein, et al, "Concurrency Control and Recovery in Database Systems," Addison-Wesley Publication Company, ISBN 0-201-10715-5, 1987, pp. 1-58.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.
Udo Steinberg, et al., "Nova: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
Cong Xu, et al., "vSlicer: Latency-Aware Virtual Machine Scheduling via Differentiated-Frequency CPU Slicing", Purdue University, Purdue e-Pubs, 2012, pp. 1-14.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.
Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.
U.S. Appl. No. 16/698,698, filed Nov. 27, 2019, Derek Bolt, et al.
U.S. Appl. No. 16/698,674, filed Nov. 27, 2019, Jeffrey Paul Heckey, et al.
U.S. Appl. No. 16/698,732, filed Nov. 27, 2019, Jeffrey Paul Heckey, et al.
U.S. Appl. No. 16/698,737, filed Nov. 27, 2019, Christopher Kasprowicz.
U.S. Appl. No. 17/491,190, dated Sep. 30, 2021, Yunong, Shi.
Unknown, "Use containers to Build, Share and Run your applications", Retrieved from https://www.docker.com/resources/what-container on Oct. 19, 2021, pp. 1-6.
Philipp Niemann, et al., "On the "Q" in QMDDs: Efficient Representation of Quantum Functionality in the QMDD Data-structure", Proceedings of the 5th International Conference on Reversible Computation, Jul. 2013, Source: http://www.informatik.uni-bremen.de/agra/doc/konf/13 rc eff _ qmdd _representation.pdf, pp. 125-140.
Jeff Barr, "Developer Preview—EC2 Instances (F1) with Programmable Hardware", AWS Blog, Nov. 30, 2016, Source: hllps://aws.amazon.com/blogs/aws/developer-preview-ec2-instances-f1-with-programmable-hardware, pp. 1-9.
Jeff Barr, "EC2 Instance Type Update—T2, R4, F1, Elastic GPUs, 13, C5", AWS Blog, Nov. 30, 2016, Source: https://aws.amazon.com/blogs/aws/ec2-instance-type-update-t2-r4-f1-elastic-gpus-i3-c5/, pp. 1-6.
Sebastian Anthony, "Google's Quantum Computing Playground turns your PC into a quantum computer", Extremetech, May 2014, Source: https://www.extremetech.com/extreme/182913-googles-quantum-computing-playground-turns-your-pc-into-a-quantum-computer, pp. 1-3.
Jeff Barr, "In the Works—Amazon EC2 Elastic GPUs", Nov. 30, 2016, Source: https://aws.amazon.com/blogs/aws/in-the-work-amazon-ec2-elastic-gpus/, pp. 1-6.
Jeff Barr, "New—Amazon EC2 Instances with Up to 8 NVIDIA Tesla V100 GPUs (P3)", AWS Blog, Oct. 25, 2017, Source: https://aws.amazon.com/blogs/aws/new-amazon-ec2-instances-with-up-to-8-nvidia-tesla-v100-gpus-p3/, pp. 1-6.
Jarrod R. McClean, et al., "OpenFermion: The Electronic Structure Package for Quantum Computers", Oct. 20, 2017, Source: https://arxiv.org/abs/1710.07629, pp. 1-18.
Barbara Kessler, "The Evolution of Manged Services in Hyperscale Cloud Environments", AWS Partner Network Blog, Sep. 28, 2016, Source: https://aws.amazon.com/blogs/apn/the-evolution-of-managed-services-in-hyperscale-cloud-environments/, pp. 1-7.
Grodzinsky, F.S., et al., "Quantum Computing and Cloud Computing: Humans Trusting Humans via Machines," IEEE International Symposium on Technology and Society (ISTAS), 2011, 5 pages.
Zeiter, Daniel, "A graphical development environment for quantum algorithms", Master's Thesis, Sep. 3, 2008, 51 pages, Retrieved from the Internet (https://doi.org/10.3929/ethz-a-005675863).
Svore, K. M., et al., "A Layered Software Architecture for Quantum Computing Design Tools", Computer, IEEE Computer Society, Jan. 2006, , pp. 74-83, vol. 39, Issue 1.
U.S. Appl. No. 17/525,723, filed Nov. 12, 2021, Milan Krneta, et al.
U.S. Appl. No. 17/491,140, filed Sep. 30, 2021, Jeffrey Paul Heckey, et al.
Puneet Bakshi, "Using Digital Tokens to Improve Amortized Performance of eSign," Aug. 12, 2018, IEEE 16th Int. Conf. on Dependable, Autonomic & Secure Comp, pp. 121-128.
Meng Zhang, et al., "Research on task scheduling scheme for quantum computing cloud platform," Aug. 18, 2022, ICCBDC 2022, pp. 7-11.
Gokul Subramanian Ravi, et al., "Adaptive job and resource management for the growing quantum cloud," 2021, IEEE International Conference on Quantum Computing and Engineering, pp. 301-312.
Keyan Cao, et al., "An Overview on Edge Computing Research," Apr. 12, 2020, IEEE Access, Special Section on Edge Computing and Networking for Ubiquitous AI, vol. 8, pp. 85714-85728, 2020.

\* cited by examiner

| Type | Type 1 Container | Type 2 Container |
|---|---|---|
| Libraries | Library $a_1$ | Library $b_1$ |
| | Library $a_2$ | Library $b_2$ |
| | ... | ... |
| | Library $a_n$ | Library $b_n$ |

FIG. 3

ON-DEMAND CO-PROCESSING RESOURCES FOR QUANTUM COMPUTING

BACKGROUND

A provider network may allow user to access services, via network connections, that are implemented using resources at locations remote from the users. Such services may be said to reside "in the cloud." A cloud-based quantum computing service may provide users access to quantum computers (also called quantum processing units) of various quantum hardware providers. Quantum computers utilize the laws of quantum physics to process information. Compared to classical (binary) computers, quantum computers work with quantum bits (or qubits). Qubits can experience the phenomena of "superposition" and "entanglement." Superposition allows a qubit to be in multiple states at the same time. For example, whereas a classical computer is based on bits that are either zero or one, a qubit may be both zero and one at the same time, with different probabilities assigned to zero and one. Entanglement is a strong correlation between qubits, such that the qubits are inextricably linked in unison even if separated by great distances. By using superposition and entanglement, quantum computers have the potential to process information in new ways to solve computational problems that are beyond the reach of classical computers.

BRIEF DESCRIPTION OF THE DRAWINGS

FIG. 3 is a diagram showing example types of containers, according to some embodiments.

Figure 1:
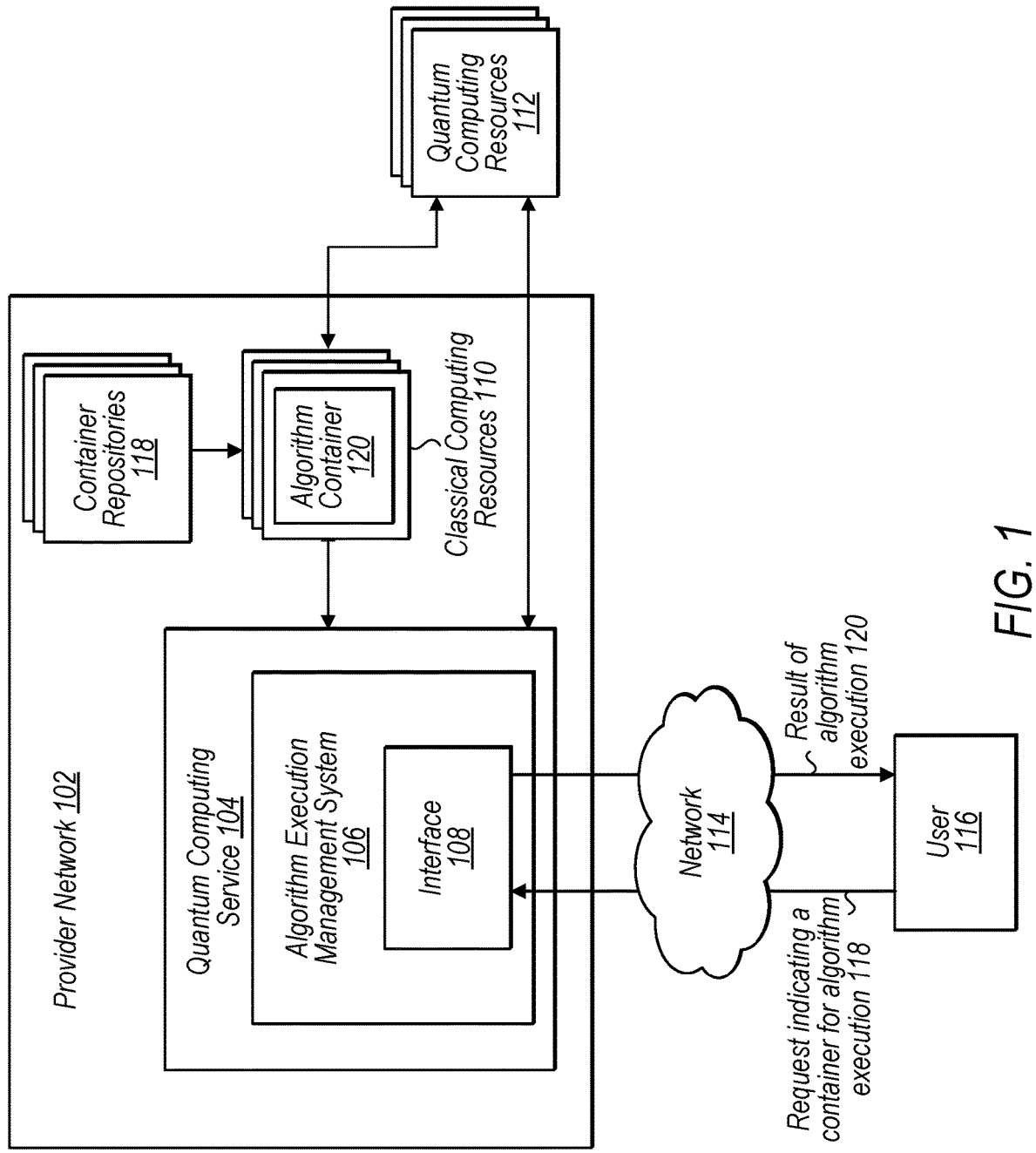
FIG. 1 is a block diagram showing an example provider network that includes an algorithm execution management system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to an algorithm execution management system of a provider network. In some embodiments, the algorithm execution management system may receive a request from a user for execution of an algorithm using different types of computing resources, including classical computing resources and quantum computing resources. In this case, the classical computing resources may be used as a co-processor of the quantum computing resources for executing the algorithm. In some embodiments, the request may indicate a container including an algorithm code and dependencies for executing the algorithm code. For example, in some embodiments, the container may include the code of the algorithm (e.g., in script files), associated libraries for executing (the code of) the algorithm at the classical computing resources, runtime (e.g., software or instructions that are executed while the algorithm is executed), and/or system tools and settings (e.g., environment variables). Thus, the container may provide a compute environment within which the algorithm may be executed at the classical computing resources. In some embodiments, the container may be created by the user using a pre-configured container offered by the provider network Alternatively, in some embodiments, the user may create the container on his/her own to specify a customized compute environment for the co-processing.

In some embodiments, responsive to receiving the request from the user, the algorithm execution management system may determine whether the quantum computing resources are available to execute the algorithm. In some embodiments, the quantum computing resources may be specified by the user in the request. For example, the user may include identifiers (or IDs) of types of the quantum computing resources in the request, based on which, the quantum computing resources may be further identified or selected from the specified types of one or more quantum computing resources. Alternatively, in some embodiments, based on the algorithm provided by the user, the algorithm execution management system may identify or select appropriate quantum computing resources (e.g., from a pool of quantum computing resources) for the user.

In some embodiments, the algorithm execution management system may cause the classical computing resources to be provisioned on-demand. For example, the algorithm execution management system may refrain from provisioning the classical computing resources, until the algorithm execution management system determines that the quantum computing resources are available to execute the algorithm. The algorithm execution management system may identify the classical computing resources (e.g., from a pool of classical computing resources) if the classical computing resources have not yet been identified, and perform configurations to provision the classical computing resources as a co-processor. The algorithm execution management system may instruct at least one portion of the algorithm to be executed at the classical computing resources using the container provided in the request, and at least another portion of the algorithm to be executed at the quantum computing resources.

In some embodiments, the quantum computing resources may create a quantum task to execute the algorithm, and the quantum task of the algorithm may be further provided a priority during execution of the algorithm over the quantum tasks of other algorithms for using the quantum computing resources. In some embodiments, the algorithm execution management system may receive a result of the execution of the algorithm from the classical computing resources and/or the quantum computing resources. In some embodiments, the result may be stored in one or more data stores of a data storage service of the provider network. A notice may be further provided to the user to indicate readiness of the result. In some embodiments, after the execution of the algorithm, the algorithm execution management system may release the classical computing resources and/or the quantum computing resources such that they may be used to execute other algorithms.

The algorithm execution management system disclosed herein can provide at least several benefits. First, the algorithm execution management system provides a convenient way for a user to execute an algorithm using different types of computing resources including classical and quantum computing resources. Generally, it is difficult for users to set up and manage their own compute environment and keep it running for the duration of the execution of an algorithm when using different computing resources. By comparison, the algorithm execution management system automates and streamlines the process. With the algorithm execution management system, a user may only need to provide the algorithm code, and if preferred, select quantum computing resources to run on. The algorithm execution management system may wait for quantum computing resources to become available, set up classical computing resources, run the algorithm in a containerized compute environment, store a result in a data storage service, and release the classical and/or quantum computing resources, without requiring further intervention from the user. Also, the algorithm execution management system can provide better performance than executing algorithms from a user's own environment. As described above, in some embodiments, the algorithm execution management system may provide the quantum tasks of the algorithm a priority during execution of the algorithm over the quantum tasks of other algorithms for using quantum computing resources. This warrants the quantum task of the algorithm to be executed ahead of the other quantum tasks, which can result in shorter and more predictable execution times for the algorithm. Additionally, the algorithm execution management system provides on-demand and flexible use of classical computing resources as a co-processor for quantum computing. As described above, in some embodiments, the algorithm execution management system may wait until quantum computing resources are available and then provision the classical computing resources. In other words, the classical computing resources may be provided as an ephemeral classical co-processor. This improves usage efficiency of computing resources, and can also reduce costs for the user especially if the costs are on a pay-as-you-go basis.

FIG. 1 is a block diagram showing an example provider network that includes an algorithm execution management system, according to some embodiments. For purposes of illustration, in this example, algorithm execution management system 106 may be implemented as part of quantum computing service 104 offered by provider network 102. Alternatively, in some embodiments, algorithm execution management system 106 may be implemented separately from quantum computing service 104, two of which may be operatively coupled with each other via network connections.

In some embodiments, algorithm execution management system 106 may include user interface 108, through which user 116 may access algorithm execution management system 106 and/or quantum computing service 104 via network 114. In some embodiments, user interface 108 may include a graphic user interface, a command line console (CLI), an application programming interface (API), and the like. In some embodiments, user 116 may access user interface 108 through an integrated development environment (IDE) that is installed at the user's local computer using a software development kit (SDK) and/or other open-source technologies. In some embodiments, network 114 may include wired and/or wireless network connections. In some embodiments, provider network 102 may also provide user 116 access to various computing resources, such as one or more classical computing resources 110 and one or more quantum computing resources 112. For purposes of illustration, in this example, it is assumed that quantum computing resources 112 are not part of network provider 102, but rather offered by a separate entity. Alternatively, in some embodiments, quantum computing resources 112 may within provider network 102. In some embodiments, classical computing resources 110 may include various computing resources based on binary bits, such as classical (binary) computers, GPUs, ASICs, etc. By comparison, quantum computing resources 112 may include various quantum computers, quantum processing units (QPUs), and/or quantum hardware based on qubits. In some embodiments, quantum computing resources 112 may be implemented using qubits built from superconductors, trapped ions, semiconductors, photonics, etc.

In some embodiments, user 116 may provide algorithm execution management system 106, e.g., via user interface 108, request 118 for executing an algorithm using different types of computing resources, including classical computing resources 110 and quantum computing resources 112. In some embodiments, request 118 may indicate a container for the algorithm, for example, container 120. In some embodiments, the container may be retrieved from container repositories 118 of provider network 102. The container may be a package of software that includes the algorithm code and its dependencies so that the algorithm code may be portable and executable from one classical computing resource to another. For example, in some embodiments, the container may include the code of the algorithm (which may be included in one or more script files), one or more associated libraries for executing the algorithm, runtime (e.g., software or instructions that are executed while the algorithm is executed), and/or one or more system tools and settings (e.g., environment variables).

Like virtual machines, a container also provides resource isolation and allocation benefits—e.g., applications (e.g., algorithms) can be executed within a compute environment (provided by the container) that are isolated from each other. Whereas, virtual machines require hypervisors to be installed on the host machine, and multiple virtual machines can then run on the same hypervisor of the host machine, and each virtual machine includes a full copy of an OS (also called the guest OS) that can be different from the OS of the host machine. By comparison, containers may not necessarily require hypervisors, but may operate on virtual machines operated by hypervisors. Multiple containers may run on the same host machine and share the OS of the host machine, each running as an isolated process in its own space. As a result, containers generally take up less space than VMs (because they do not include a copy of an OS). More importantly, containers may be considered a standalone and portable software package that can be executed from one host machine to another. Given the characteristics of containers, the container indicated by request 118 may thus provide a containerized compute environment within which the algorithm may be executed at classical computing resources 110. In some embodiments, the container indicated by request 118 may be moved between virtual machines, for example due to processing requirements, without having to re-configure the contents of the container.

In some embodiments, the container may be created using one or more pre-configured containers offered by provider network 102. For example, in some embodiments, prior to receiving request 118, user 116 may provide another request to algorithm execution management system 106 to create the container. In some embodiments, algorithm execution management system 106 may provide one or more pre-configured containers that includes example codes and libraries. For example, as indicated in FIG. 1, in some embodiments, provider network 102 may include one or more repositories 118 that store one or more pre-configured containers that may be used as templates to create a container, such as container 120, to execute the algorithm. In some embodiments, container repositories 118 may be implemented as one or more data stores. In some embodiments, user 116 may select one of the pre-configured containers to create the container. In some embodiments, user 116 may further store the created container at container repositories 118 of provider network 102. Therefore, when user 116 provide request 118, user 116 may simply provide a directory or path of the container to indicate the container in request 118. Accordingly, algorithm execution management system 106 may cause the directory or path to retrieve the container for executing the algorithm.

Alternatively, in some embodiments, the container may be created by user 116 without using pre-configured containers provided by provider network 102. In this way, the container may be considered a customized container that allows user 116 to specify a customized compute environment for execution of the algorithm. Similarly, prior to receiving request 118, user 116 may provide another request to algorithm execution management system 106 to create the container, such as container 120. In some embodiments, the container may include the customized algorithm code and one or more appropriate libraries for executing the customized code in the container. In some embodiment, the libraries may include libraries for executing the algorithm at classical computing resources 110, but also at quantum computing resources 112. Similarly, user 116 may request the customized container to be stored in container repositories 118 of provider network 102, and accordingly indicate the directory or path of the stored container in request 118 for executing the algorithm using the container. In some embodiments, the container may also include one or more environment variables, and user 116 may specify their values to further customize the compute environment. For example, user 116 may use environment variable to customize an input path or directory in the container for retrieving the algorithm code (e.g., the script files and/or graphic diagram files), an output path or directory for storing execution results, a path or directory for retrieving customized hyperparameters (e.g., if the algorithm is a machine learning model training algorithm), a path or directory for storing checkpoint data such that user 116 may interrupt the algorithm execution, store the data, and resume the execution at a later time, etc.

In some embodiments, the code of the algorithm in the container may be composed as script files using quantum computing languages, such as Quil, Open QASM, cQASM, etc. In addition, in some embodiments, the code may be composed as graphic diagrams files that include quantum gates. Either way, responsive to receiving request 118, algorithm execution management system 106 may cause the code to be converted into executable code for execution at classical computing resources 110 and quantum computing resources 112. In some embodiments, the conversion may include first translating the code into quantum gates, and then compiling the quantum gates into executable code. In some embodiments, the conversion may be performed at algorithm execution management system 106 and/or quantum computing service 104.

In some embodiments, responsive to receiving request 118 from user 116, algorithm execution management system 106 may determine whether quantum computing resources 112 are available to execute the algorithm. In some embodiments, quantum computing resources 112 may be specified by user 116. For example, in some embodiments, user 116 may embed an identifier (or ID) of a type of a quantum computing unit (QPU) into a value of an environment variable of the container, and then include the value of the environment variable in the algorithm code. Alternatively, in some embodiments, based on the algorithm provided by user 116, algorithm execution management system 106 may recommend and identify appropriate quantum computing resources 112 (e.g., from a pool of quantum computing resources) for user 116.

In some embodiments, algorithm execution management system 106 may cause classical computing resources 110 to be provisioned on-demand. For example, in some embodiments, algorithm execution management system 106 may first determine whether quantum computing resources 112 are available to execute the algorithm. When it is determined that quantum computing resources 112 are available, algorithm execution management system 106 may then cause classical computing resources 110 to be provisioned. For example, algorithm execution management system 106 may identify classical computing resources 110 (e.g., from a pool of classical computing resources), and perform configurations to provision classical computing resources 110 for executing the algorithm.

In some embodiments, quantum computing resources 112 may not become available immediately because quantum computing resources 112 may receive multiple algorithms for execution, but the total number of concurrent executions may be restricted. Thus, in some embodiments, the algorithm may be queued, together with other algorithms, temporarily in a storage. In some embodiments, the algorithms in the queue may be executed in a sequential order. In some embodiments, computing resources 112 may become available to execute an algorithm when the algorithm moves up to the first position in the queue or otherwise given a priority.

In some embodiments, once classical computing resources 110 are provisioned, algorithm execution management system 106 may instruct one or more portions of the algorithm to be executed at classical computing resources 110 using the container indicated by request 118, and one other more other portions of the algorithm to be executed at quantum computing resources 112. As described above, the container may include the algorithm code and dependencies for executing the code at classical computing resources 110. Thus, the container may provide a containerized compute environment within which the algorithm may be executed. Further, as described above, the containerized compute environment may provide isolation for the algorithm from other algorithms that may be executed at classical computing resources 110 around the same time. Also, the container may be portable and executed from one type of classical computing resource to another.

In some embodiments, during execution of the algorithm, classical computing resources 110 and quantum computing resources 112 may iteratively exchange data. For example, in some embodiments, at one step, quantum computing resource 112 may receive data from classical computing resource 110. The data received from classical computing resource 110 may include calculation results at classical computing resource 110. Based on the data, quantum computing resource 112 may proceed to complete the step of the execution, and in return provide calculation results back to classical computing resource 110. Next, classical computing resource 110 may use the data from quantum computing resource 112 to finish a next step of execution. The iterative process may continue until execution of the algorithm completes or aborts.

In some embodiments, algorithm execution management system 106 may provide the quantum task of the algorithm a priority over quantum tasks of other algorithm for using quantum computing resources 112 during execution of the algorithm. In other words, the algorithm may be executed by quantum computing resources 112 ahead of other quantum tasks that may be queued up. In some embodiments, the priority may be provided by algorithm execution management system 106 by assigning a token to the container. This way, when the algorithm is executed at quantum computing resources 112, the algorithm may be considered having the priority as long as the token is valid.

In some embodiments, algorithm execution management system 106 may receive one or more results from classical computing resources 110 and/or quantum computing resources 112. In some embodiments, the results may be received during execution of the algorithm. In addition, in some embodiments, the results may not be received until after the end of the execution. In some embodiments, the results may be received by classical computing resources 110 from quantum computing resources 112, and then sent from classical computing resources 110 to algorithm execution management system 106. In some embodiments, the results may be stored in one or more data stores of a data storage service of provider network 102. In addition, in some embodiments, notice 120 may be provided to user, e.g., via user interface 108, to indicate that the results are available. In some embodiments, after execution of the algorithm, algorithm execution management system 106 may cause classical computing resources 110 and/or quantum computing resources 112 to be released such that they may be used to execute other algorithms by user 116 or other users.

Figure 2:
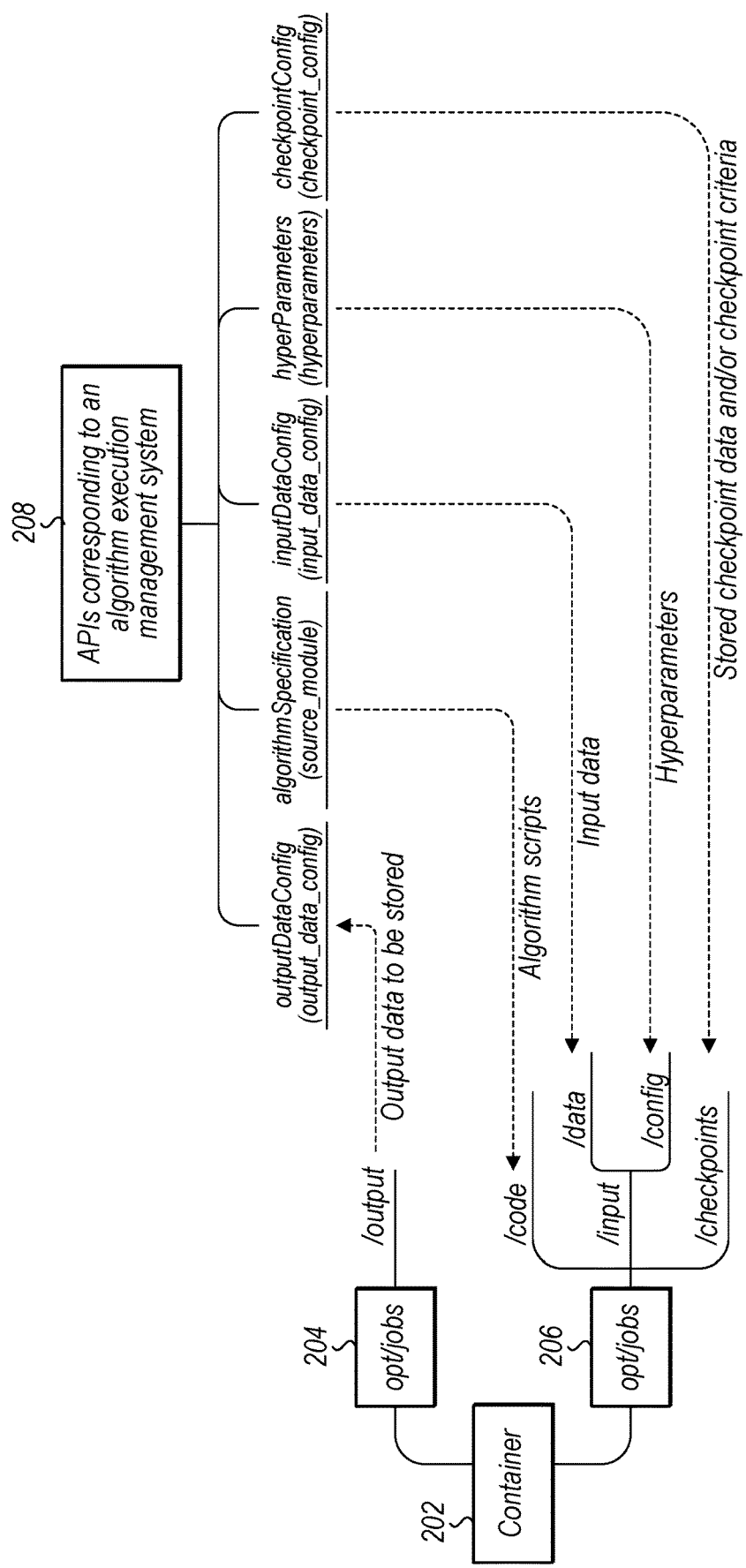
FIG. 2 is a diagram showing example contents of a container and interactions between the container and an algorithm execution management system via an application programming interface (API), according to some embodiments.

FIG. 2 shows example contents of a container and interactions between the container and an algorithm execution management system via an application programming interface (API), according to some embodiments. In FIG. 2, in some embodiments, container 202 may include one or more folders, such as folder 204 "opt/jobs/output" and folders 206 "opt/jobs/code," "opt/jobs/input/data," "opt/jobs/input/config," and/or "opt/jobs/checkpoints." In some embodiments, folder 204 "opt/jobs/output" may refer to a local folder within container 202 for saving data created from execution of the algorithm. For example, the data may include the result of the algorithm when the execution completes or is paused at a checkpoint. Further, container 202 may be associated with a variable "output_data_config" whose value may be specified. Based on the value of the variable "output_data_config," application programming interface (API) 208 corresponding to an algorithm execution management system (e.g., algorithm execution management system 106) may use the variable "output_data_config" to copy the data from folder 204 "opt/jobs/output" of container 202 to a location, e.g., a data store of a provider network, specified by the variable "output_data_config" or a default location if the value is not specified.

In some embodiments, folder 206 "opt/jobs/code" may specify a local folder within container 202 into which the algorithm code may be copied, e.g., by API 208, from a data store of the provider network as specified by the variable "source_module." For example, as described above, in some embodiments, container 202 may be created based on a preconfigured container provided by the provider network. Thus, the algorithm code may have been available at a location in the provider network, and thus may be copied from the location to folder 206 "opt/jobs/input." Alternatively, in some embodiments, container 202 may be created by a user without using a preconfigured container provided by the provider network. In that case, the algorithm code may still have been provided by the user and stored at a location in the provider network. Alternatively, in some embodiments, the algorithm code may be originally included in container 202, rather than copied from (the location) of the provider network.

Similarly, in some embodiments, container 202 may include folders 206 "opt/jobs/input/data" and/or "opt/jobs/input/config" that may refer to local folders within container 202 into which input data and/or other configuration data may be copied, e.g., by API 208, from locations or data stores of the provider network specified respectively by the variables "input_data_config" and/or "hyperparameters." For example, when the algorithm includes training of a machine learning model, the input data may include training and/or testing data sets, and the configuration data may include hyperparameters for the machine learning model.

In some embodiments, container 202 may also include folder 206 "opt/jobs/checkpoints" that may specify a local folder within container 202 into which checkpoint data may be copied, e.g., by API 208, from a location or data store of the provider network specified by the variable "checkpoint_config." In some embodiments, a checkpoint may allow the execution of an algorithm to be paused, and data available at the checkpoint to be stored. The execution of the algorithm may be later resumed using the data stored at the checkpoint, thus avoiding repeating the algorithm from the beginning. In some embodiments, a checkpoint may be triggered using one or more checkpoint criteria. For example, when the execution of the algorithm causes the checkpoint criteria to be satisfied, the checkpoint may then be activated to pause the execution and store the data. In some embodiments, the checkpoint data may include data stored at a previous checkpoint. Also, in some embodiments, the checkpoint data may also include the values for the one or more checkpoint criteria.

FIG. 3 shows example types of containers, according to some embodiments. In some embodiments, type 1 container may correspond to a default type container that is supported by an algorithm execution management system of a provider network. Accordingly, a type 1 container may require one or more libraries, such as library $a_1, a_2, \ldots, a_n$ for executing an algorithm code within the compute environment provided by the type 1 container. In some embodiments, the algorithm execution management system may also support other types of containers, such as a type 2 container. In some embodiments, type 2 container may be created using third-party and/or open source environment libraries that are not necessarily originated by the provider network. For example, type 2 container may be a container with TensorFlow, PyTorch, etc. libraries. In some embodiments, a type 2 container may need some of the same libraries as the type 1 container, or may require some different libraries. For purposes of illustration, in FIG. 3, type 2 container may require libraries such as library $b_1, b_2, \ldots b_n$.

Figure 4:
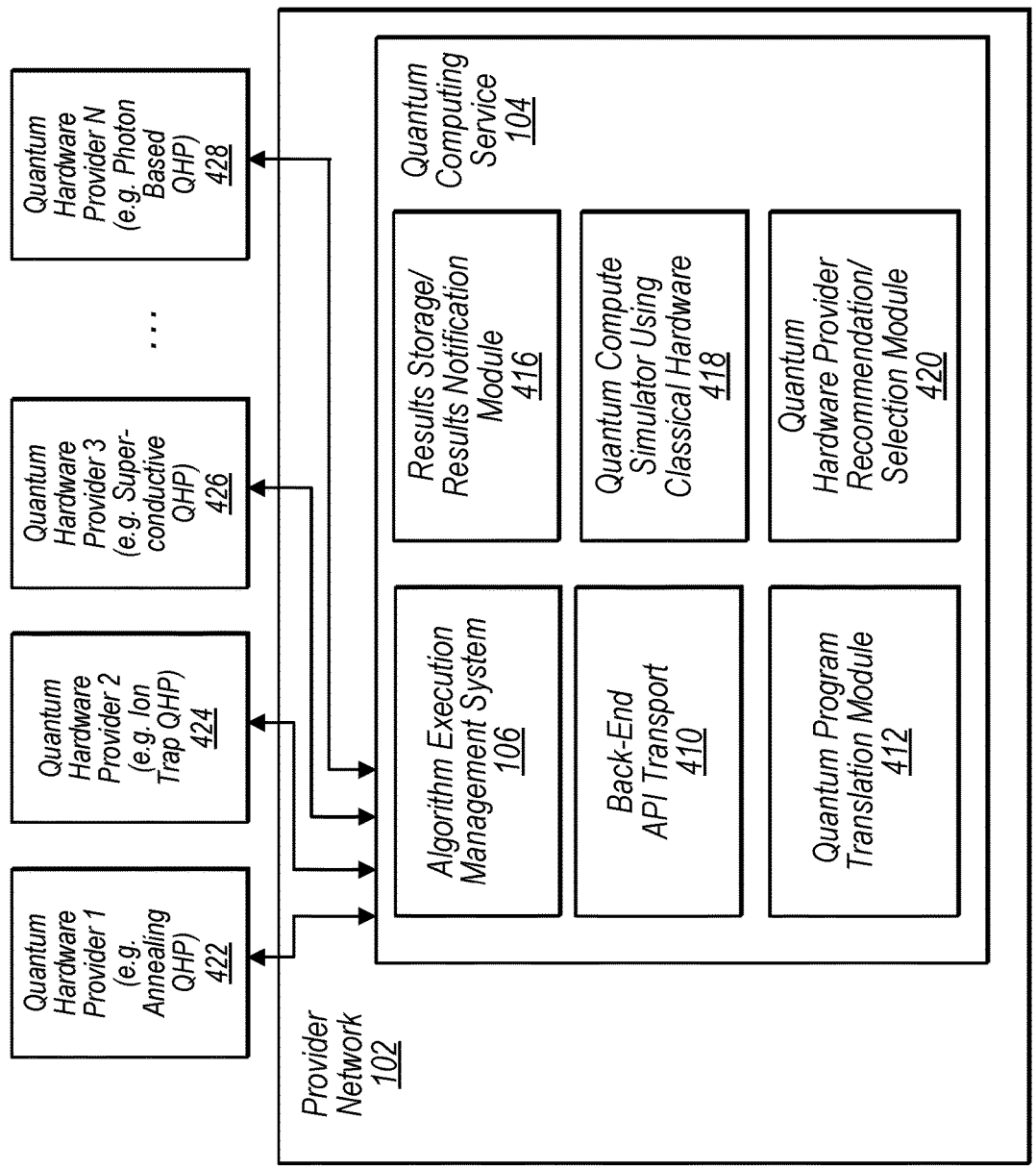
FIG. 4 is a block diagram showing an example quantum computing service of a provider network, according to some embodiments.

FIG. 4 shows an example quantum computing service of a provider network, according to some embodiments. In FIG. 4, provider network 102 may include quantum computing service 104, which may provide user 116 access to various quantum computing resources offered by quantum hardware providers 422, 424, 426, and 428. As indicated in FIG. 4, quantum hardware providers 422, 424, 426, and 428 may provide various different types of quantum computing resources. In some embodiments, quantum computing service 104 may include translation module 412. As described above, when algorithm execution management system 106 receives request 118 indicating a container that include algorithm code and dependencies, translation module 412 may translate the code to gate-level code.

In some embodiments, quantum computing service 104 may include back-end API transport module 410. Algorithms that have been translated by translation module 412 (to a native language) may be provided to back-end API transport module 410 in order for the translated algorithms to be compiled into executable code and transported to quantum computing resources 112 at a respective quantum hardware provider location for execution. In some embodiments, back-end API transport module 410 may implement one or more queues to queue the translated algorithm for execution on quantum computing resources 112 of the quantum hardware provider. In some embodiments, the algorithm may be transmitted via a back-end API transport module 410 and later compiled at a quantum hardware provider.

In some embodiments, results of executing the algorithm on quantum computing resources 112 at the quantum hardware provider location may be stored in a data storage system of provider network 102. In some embodiments, results storage/results notification module 416 may coordinate storing results and may notify user 116 that the results are ready from the execution of the user's algorithm. In some embodiments, results storage/results notification module 416 may cause storage space in a data storage service to be allocated to user 116 to store the user's results. Also, the results storage/results notification module 416 may specify access restrictions for viewing the user's results in accordance with user preferences.

In some embodiments, quantum compute simulator using classical hardware 418 of quantum computing service 104 may be used to simulate an algorithm using classical hardware. For example, one or more virtual machines of a virtual computing service may be instantiated to process an algorithm simulation job. In some embodiments, user 116 may use a container (e.g., the container indicated by request 118) to request an algorithm to be simulated. In that case, the simulation may involve multiple classical computing resources, where some may be used to simulate quantum computing and the others may be used as a co-processor to process the classical computing. In some embodiments, quantum compute simulator using classical hardware 418 may fully manage compute instances that perform the simulation. For example, in some embodiments, user 116 may submit an algorithm to be simulated and quantum compute simulator using classical hardware 418 may determine resources needed to perform the simulation job, reserve the resources, configure the resources, etc. In some embodiments, quantum compute simulator using classical hardware 418 may include one or more "warm" simulators that are pre-configured simulators such that they are ready to perform a simulation job without a delay typically involved in reserving resources and configuring the resources to perform simulation.

In some embodiments, quantum computing service 104 includes quantum hardware provider recommendation/selection module 420. As described above, in some embodiments, user 116 may specify quantum computing resources 112 to be used for executing the user's algorithm. For example, user 116 may specify quantum computing resources 112 using an environment variable. Alternatively, in some embodiments, algorithm execution management system 106 may use quantum hardware recommendation/selection module 420 to make a recommendation to user 116 as to which type of quantum computer or which quantum hardware provider to use to execute a quantum program submitted by the user. Additionally, quantum hardware provider recommendation/selection module 420 may receive a user selection of a quantum computer type and/or quantum hardware provider to use to execute the user's quantum program.

Figure 5:
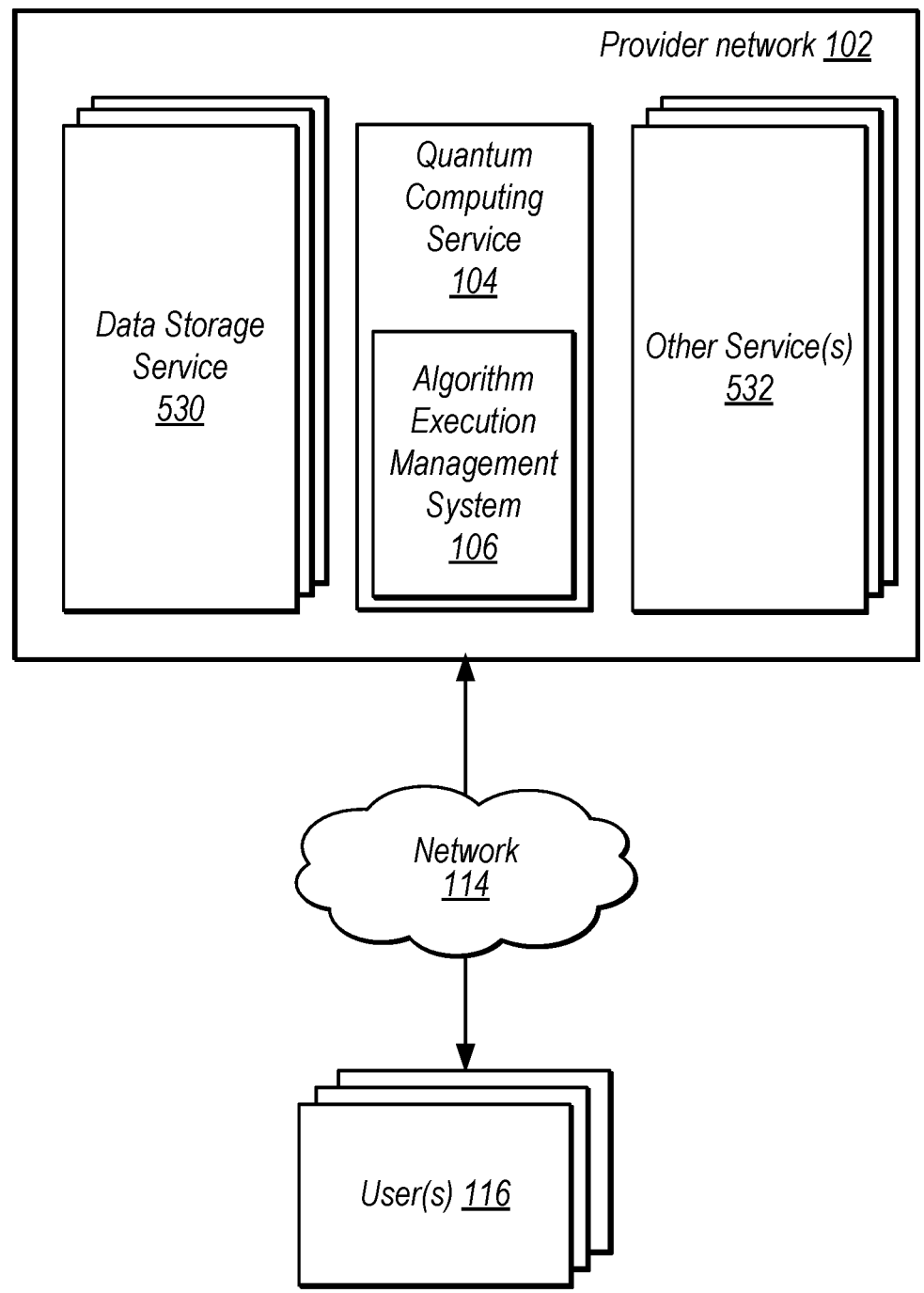
FIG. 5 is a block diagram showing an example provider network including an algorithm execution management system and other cloud-based services, according to some embodiments.

FIG. 5 is a block diagram showing an example provider network including an algorithm execution management system and other cloud-based services, according to some embodiments. In some embodiments, provider network 102 may be a private or closed system or may be set up by an entity such as a company or a public sector organization to provide one or more services (such as various types of cloud-based storage) accessible via network 114 to one or more users 116. Provider network 102 may be implemented in a single location or may include numerous data centers hosting various resource pools, such as collections of physical and/or virtualized computer servers, storage devices, networking equipment and the like, needed to implement and distribute the infrastructure and storage services offered by provider network 104. In some embodiments, provider network 104 may implement various network-accessible services, such as quantum computing service 104, data storage service 530, and one or more other services 532, as indicated in FIG. 5. In some embodiments, provider network 102 may further include algorithm execution management systems 106. In this example, algorithm execution management system 106 may be implemented as part of quantum computing service 104. Alternatively, in some embodiments, algorithm execution management systems 106 may be implemented separately from quantum computing service 104, two of which may be operatively coupled with each other via one or more network connections.

In some embodiments, data storage service 530 may implement different types of data stores for storing, accessing, and managing data on behalf of users 116 as a network-based service that enables one or more users 116 to operate a data storage system in a cloud or network computing environment. For example, data storage service 530 may include various types of database storage services (both relational and non-relational) or data warehouses for storing, querying, and updating data. Such services may be enterprise-class database systems that are scalable and extensible. Queries may be directed to a database or data warehouse in data storage service 530 that is distributed across multiple physical resources, and the database system may be scaled up or down on an as needed basis. The database system may work effectively with database schemas of various types and/or organizations, in different embodiments. In some embodiments, users/subscribers may submit queries in a number of ways, e.g., interactively via a n SQL interface to the database system. In other embodiments, external applications and programs may submit queries using Open Database Connectivity (ODBC) and/or Java Database Connectivity (JDBC) driver interfaces to the database system.

In some embodiments, data storage service 530 may also include various kinds of object or file data stores for putting, updating, and getting data objects or files, which may include data files of unknown file type. Such data storage service 530 may be accessed via programmatic interfaces (e.g., APIs) or graphical user interfaces. Data storage service 530 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

As described above, in some embodiments, provider network 102 may provide users 116 access to different types of computing resources, such as classical computing resources 110 and quantum computing resources 112. In some embodiments, provider network 102 may use algorithm execution management system 106 to automate and streamline execution of an algorithm for user 116 using the different types of computing resources. For example, in some embodiments, algorithm execution management system 106 may receive request 118 from user 116 for executing an algorithm using the different computing resources. In some embodiments, request 118 may indicate a container that includes algorithm code and libraries for executing the algorithm at classical computing resources 110. In some embodiments, the container may be created by user 116 without using a container provided by provider network 102. Alternatively, in some embodiments, the container may be created using a container provided by provider network 102. In embodiments, in response to receiving request 118, algorithm execution management system 106 may determine whether quantum computing resources 112 are available to execute the algorithm. In response to determining that quantum computing resources 112 are available, algorithm execution management system 106 may cause classical computing resources 110 to be provisioned, and instructed at least one portion of the algorithm to be executed at classical computing resources 110 using a compute environment provided by the container and at least another portion of the algorithm to be executed at quantum computing resources 112. In some embodiments, the quantum task of the algorithm may be provided a priority over quantum tasks of other algorithms for using quantum computing resources 112 during execution of the algorithm. In some embodiments, algorithm execution management system 106 may receive a result of the execution of the algorithm from classical computing resources 110 and/or quantum computing resources 112.

In some embodiments, other service(s) 532 may include various types of computing services. For example, in some embodiments, data processing service 532 may include one or more computing services that may provide users 116 access to various computing resources at one or more data centers. In some embodiments, the computing resources may include classical computing resources 110, and/or quantum computing resources 112. In some embodiments, the computing services may include an elastic compute cloud service that may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In some embodiments, other service(s) 332 may include data processing services to perform different functions (e.g., anomaly detection, machine learning, querying, or any other type of data processing operation). For example, in some embodiments, the data processing services may include a map reduce service that creates clusters of processing nodes that implement map reduce functionality over data stored in data storage service 330. Various other distributed processing architectures and techniques may be implemented by data processing services (e.g., grid computing, sharding, distributed hashing, etc.). Note that in some embodiments, data processing operations may be implemented as part of data storage service 330 (e.g., query engines processing requests for specified data).

Generally speaking, users 116 may encompass any type of user configurable to submit network-based requests to provider network 102 via network 114, including requests for executing algorithms using different types of computing resources. For example, a given user 116 may include a suitable version of a web browser, or may include a plug-in module or other type of code module configured to execute as an extension to or within an execution environment provided by a web browser. Alternatively, a user 116 may encompass an application, such as a quantum computing application with an integrated development environment. In some embodiments, users 116 may include sufficient protocol support (e.g., for a suitable version of Hypertext Transfer Protocol (HTTP)) for generating and processing network-based services requests without necessarily implementing full browser support for all types of network-based data. That is, users 116 may be an application configured to interact directly with provider network 102. In some embodiments, users 116 may be configured to generate network-based services requests according to a Representational State Transfer (REST)-style network-based services architecture, a document- or message-based network-based services architecture, or another suitable network-based services architecture.

In some embodiments, network 114 may encompass any suitable combination of networking hardware and protocols necessary to establish network-based-based communications between users 116 and provider network 102. For example, network 114 may generally encompass the various telecommunications networks and service providers that collectively implement the Internet. Network 114 may also include private networks such as local area networks (LANs) or wide area networks (WANs) as well as public or private wireless networks. For example, both a given user 116 and provider network 102 may be respectively provisioned within enterprises having their own internal networks. In such an embodiment, network 114 may include the hardware (e.g., modems, routers, switches, load balancers, proxy servers, etc.) and software (e.g., protocol stacks, accounting software, firewall/security software, etc.) necessary to establish a networking link between given user 116 and the Internet as well as between the Internet and provider network 102. It is noted that in some embodiments, users 116 may communicate with provider network 102 using a private network rather than the public Internet.

Figure 6:
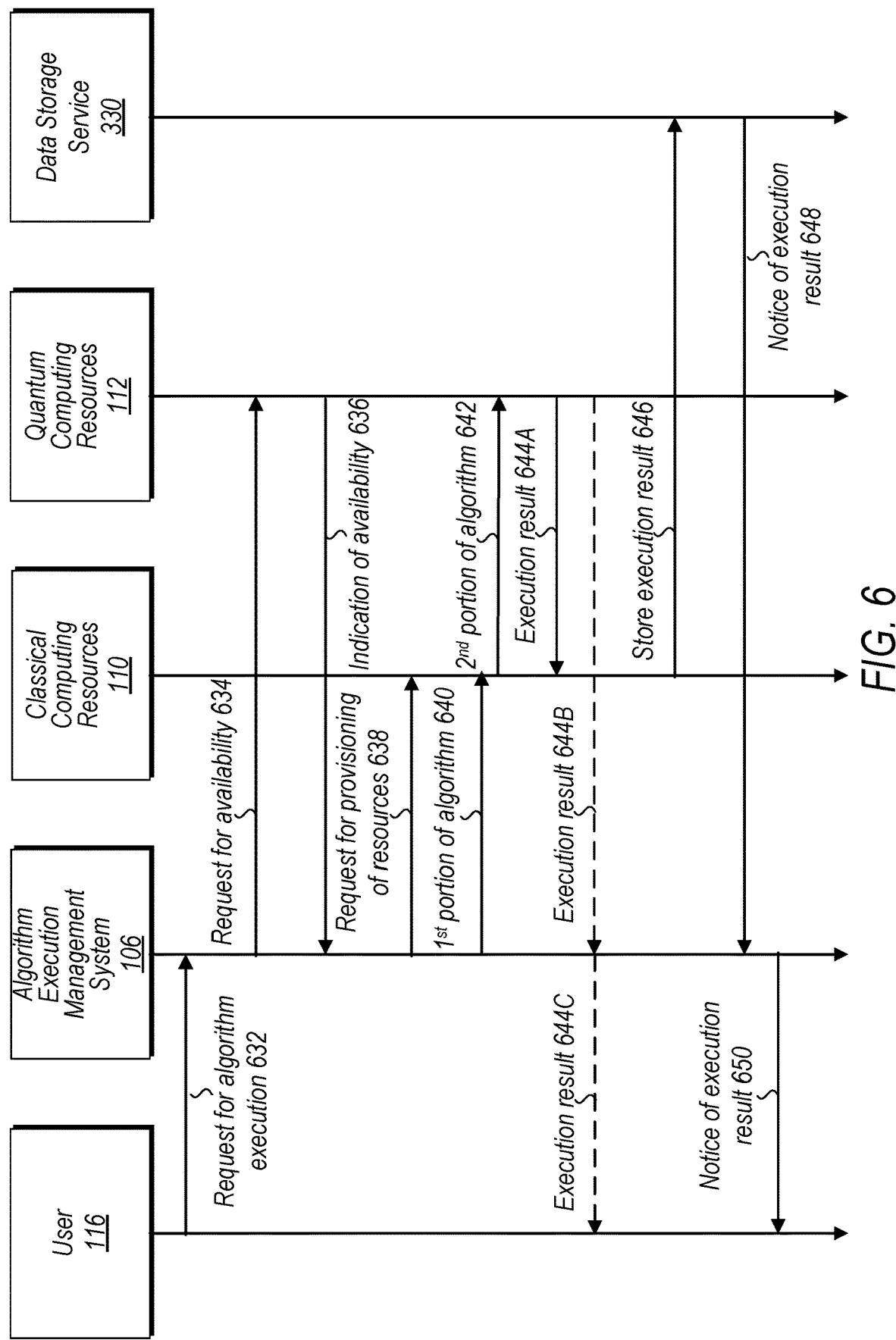
FIG. 6 is a logical block diagram illustrating interactions to execute an algorithm using an algorithm execution management system, according to some embodiments.

FIG. 6 is a logical block diagram illustrating interactions to execute an algorithm using an algorithm execution management system, according to some embodiments. In FIG. 6, in some embodiments, algorithm execution management system 106 may receive a request 432 from user 116 for executing an algorithm using different quantum computing resources, including classical computing resources 110 and quantum computing resources 112. In some embodiments, request 432 may indicate a container that further includes code of the algorithm (e.g., one or more script files and/or graphic diagram files including the code) and one or more libraries for executing the algorithm.

As described above, in some embodiments, the container may be created by user 116 without using a container (e.g., a pre-configured container) provided by provider network 102. Alternatively, in some embodiments, the container may be created using a container provided by provider network 102. For example, in some embodiments, provider network may provide a list of one or more containers, and user 116 may select one of them (e.g., as a template) to create the container to be indicated by request 632.

In some embodiments, in response to receiving request 632, algorithm execution management system 106 may send request 634 to determine whether quantum computing resources 112 are available to execute the algorithm. In some embodiments, request 634 may send at least part of the algorithm to a queue for quantum computing resources 112. In some embodiments, the queue may reside remotely from quantum computing resources 112, e.g., using storage resources of provider network 102. Alternatively, in some embodiments, the queue may be implemented locally at quantum computing resources 112.

In some embodiments, algorithm execution management system 106 may receive indication 636 that quantum computing resources 112 are available to execute the algorithm. As described above, in some embodiments, the indication may be received after the algorithm moves up to the first position in the queue or otherwise a given priority.

In some embodiments, when algorithm execution management system 106 determines that quantum computing resources 112 are available to execute the algorithm, algorithm execution management system 106 may send request 638 to cause classical computing resources 110 to be provisioned. As described above, in some embodiments, algorithm execution management system 106 may use request 638 to identify classical computing resources 110 from a pool of classical computing resources if classical computing resources 110 have not been identified, and perform appropriate configurations to make classical computing resources 110 ready for executing the algorithm.

In some embodiments, algorithm execution management system 106 may cause at least a first portion of the algorithm 640 to be executed at classical computing resources 110, and at least a second portion of the algorithm 642 to be executed at quantum computing resources 112. As described above, in some embodiments, execution of the algorithm at classical computing resources 110 may be performed within the containerized compute environment provided by the container. Moreover, in some embodiments, execution of the algorithm at quantum computing resources 112 may be provided a priority over other algorithm.

In some embodiments, results 644A, 644B, and/or 644C may be provided by quantum computing resources 112, and then stored 646 in one or more data stores of a data storage service of provider network 102. In this example, for purposes of illustration, it is assumed that results 644A are provided only from quantum computing resources 112, received at classical computing resources 110, and then stored in the data stores. Alternatively, in some embodiments, classical computing resources 110 may also provide an execution result. Further, in some embodiments, the results may be received at algorithm execution management system 106. In addition, in some embodiments, quantum computing resources 112 may provide results 644B to algorithm execution management system 106. In some embodiments, quantum computing resources 112 may further provide results 644C to user 116.

In some embodiments, notice of the execution result 648 may be received at algorithm execution management system 106. In some embodiments, notice 650 may be provided to user 116 to indicate that the execution result is available.

Figure 7:
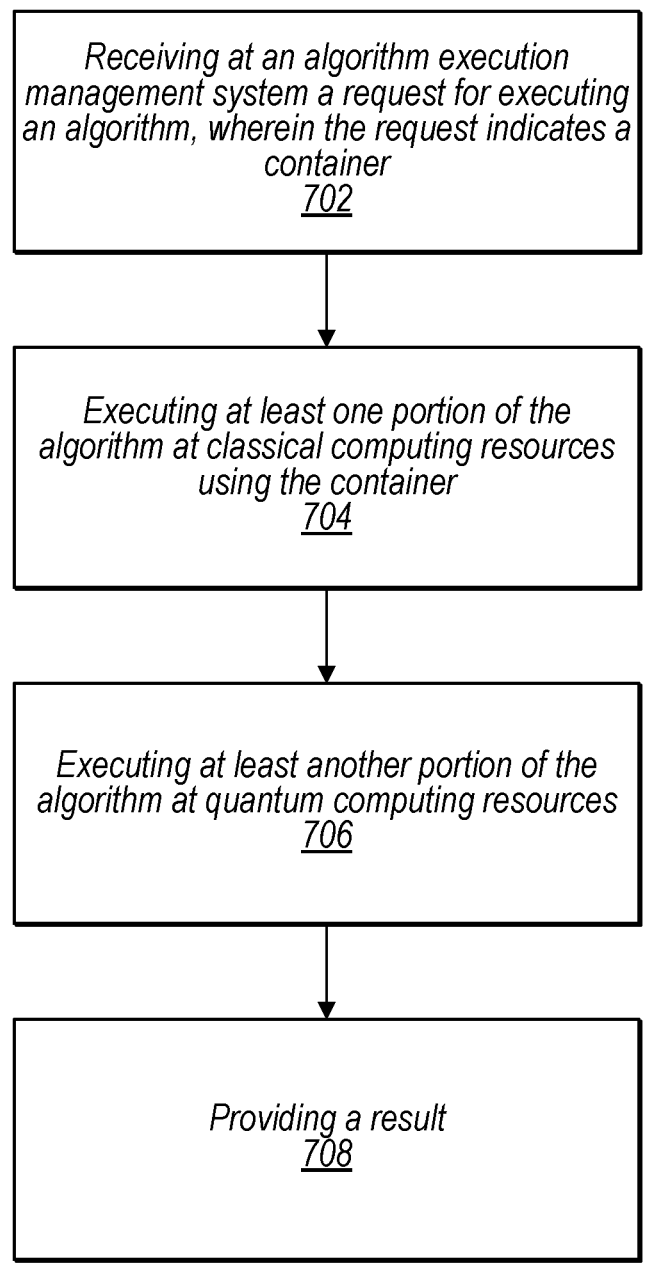
FIG. 7 is a flowchart illustrating an example method for executing an algorithm using different computing resources, according to some embodiments.

FIG. 7 is a flowchart illustrating an example method for executing an algorithm using different computing resources, according to some embodiments. In FIG. 7, in some embodiments, a request may be received, e.g., from a user, at an algorithm execution management system via a user interface (e.g., at algorithm execution management system 106 via user interface 108) for executing an algorithm using different computing resources, including one or more classical computing resources (e.g., classical computing resources 110) and one or more quantum computing resources (e.g., classical computing resources 112), as indicated in block 702. In some embodiments, the request may indicate a container having the algorithm code (e.g., in one or more script files and/or graphic diagram files), and one or more libraries for executing the algorithm.

In some embodiments, the container may be created by the user using a container created by a user of the provider network, without using a container provided by the provider network. Alternatively, in some embodiments, the container may be created using a container provided by the provider network. Also, in some embodiments, the container may be stored in a data store provided by the provider network. In some embodiments, the request received at the algorithm execution management system may indicate a directory or path from which the stored container may be retried for executing the algorithm.

In some embodiments, the algorithm execution management system may instruct at least one portion of the code of the algorithm to be executed at the classical computing resources using the container, as indicated in block 704. As described above, in some embodiments, the container may provide a containerized compute environment within which the portion of the code may be executed at the classical computing resources. In addition, as described above, in some embodiments, the algorithm execution management system may not instruct the algorithm to be executed at the classical computing resources until after the algorithm execution management system determines that the quantum computing resources are available to execute the algorithm.

In some embodiments, the algorithm execution management system may instruct at least another portion of the code of the algorithm to be executed at the quantum computing resources, as indicated in block 706. As described above, in some embodiments, the quantum computing resources may be specified by the user in the request provided to the algorithm execution management system. For example, the user may specify a type of the quantum computing resources, and the algorithm execution management system may identify or select the quantum computing resources from the specified types of one or more quantum computing resources. Further, as described above, in some embodiments, the quantum task of the algorithm may be provided a priority over quantum tasks of other algorithms for using the quantum computing resources during execution of the algorithm.

In some embodiments, a result may be provided, e.g., by the algorithm execution management system to the user, as indicated in block 708. As described above, in some embodiments, the result may be received from the classical computing resources and/or the quantum computing resources. In some embodiments, the result may be stored in a data store that is implemented as part of a data storage service (e.g., data storage service 530) of the provider network. In addition, in some embodiments, a noticed may be provided to the user to indicate that the result is available. Moreover, in some embodiments, after execution of the algorithm, the classical computing resources and/or the quantum computing resources may be released.

Figure 8:
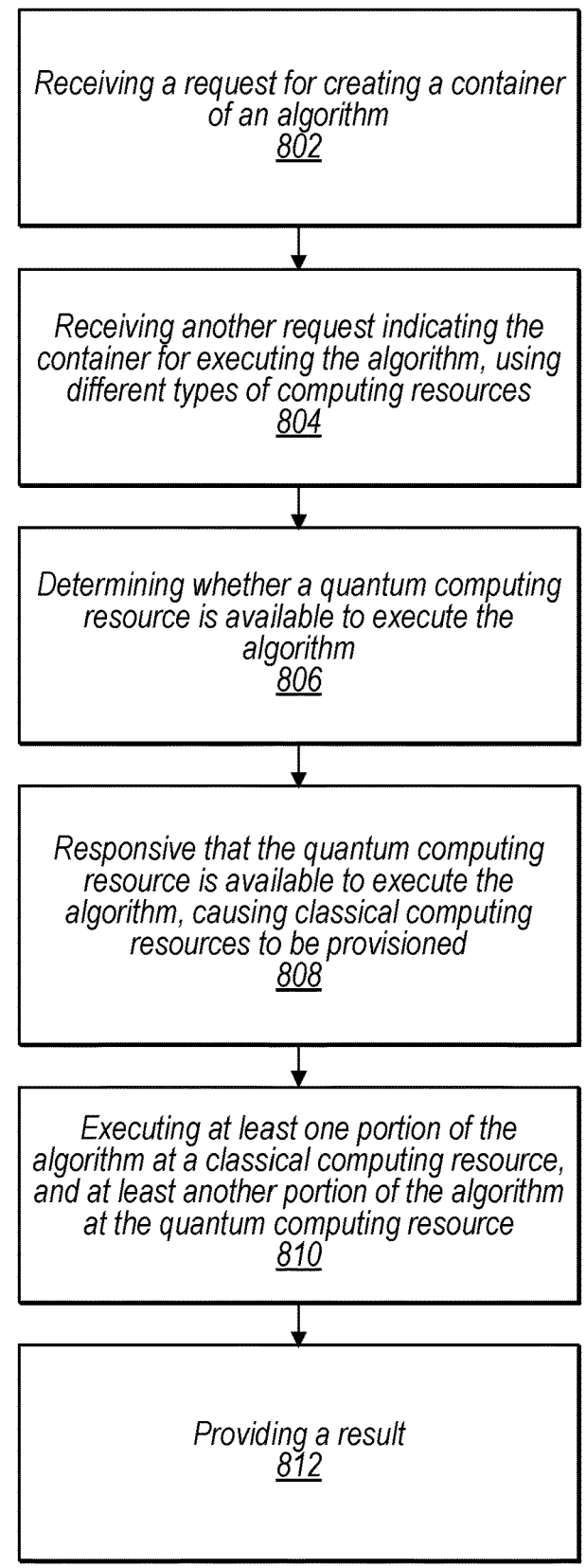
FIG. 8 is a flowchart illustrating another example method for executing an algorithm using different computing resources, according to some embodiments.

FIG. 8 is a flowchart illustrating another example method for executing an algorithm using different computing resources, according to some embodiments. In FIG. 8, in some embodiments, a request may be received, e.g., from a user, at an algorithm execution management system of a provider network via a user interface (e.g., at algorithm execution management system 106 via user interface 108) for creating a container of an algorithm, as indicated in block 802. As described above, in some embodiments, the algorithm execution management system may provide one or more containers, such as pre-configured container, that may include example codes, libraries, and system configurations. Thus, in the request, the user may select and use one of the pre-configured containers to create the container. In some embodiments, the container may be stored in a data store provided by the provider network. Alternatively, in some embodiments, the container may be created by the user without using the provided containers. For example, the user may create a customized container to include customized algorithms, libraries, and system configurations. In the request, the user may then upload the container to the algorithm execution management system to store the container in a data store of the provider network.

In some embodiments, another request may be received, e.g., from the user at the algorithm execution management system via the user interface for executing the algorithm using different computing resources, including one or more classical computing resources (e.g., classical computing resources 110) and one or more quantum computing resources (e.g., classical computing resources 112), as indicated in block 804. As described above, in some embodiments, the request may indicate the container by indicating a directory or path from which the container may be retrieved. In some embodiments, the directory or path may direct to a data store of the provider network in which the container may be stored.

In some embodiments, responsive to receiving the request, the algorithm execution management system may determine whether the quantum computing resources are available to execute the algorithm, as indicated in block 806. As described above, in some embodiments, after receiving the algorithm, the algorithm may be first stored temporarily in a queue. The quantum computing resources may become available to execute the algorithm until after the algorithm moves up to the first position in the queue.

In some embodiments, responsive to determining that the quantum computing resources are available, the algorithm execution management system may cause the classical computing resources to be provisioned, as indicated in block 808. As described above, in some embodiments, the algorithm execution management system may select the quantum computing resources from a pool of available computing resources, and then perform configurations to provision the classical computing resources.

In some embodiments, the algorithm execution management system may instruct at least one portion of the algorithm to be executed at the classical computing resources, and at least another portion of the algorithm to be executed at the quantum computing resources, as indicated in block 810. As described above, in some embodiments, the execution of the algorithm at the classical computing resources may be performed using the container provided by the user. For example, in some embodiments, the container may provide the algorithm code and dependencies, such as libraries, runtime, and/or other system tools and settings. As a result, the container may provide a containerized compute environment to execute the algorithm. In addition, as described above, in some embodiments, the quantum task of the algorithm may be provided a priority during execution of the algorithm over quantum tasks of other algorithms for using the quantum computing resources.

In some embodiments, the algorithm execution management system may provide a result of the execution of the algorithm, as indicated in block 812. In some embodiments, the result may be provided from the classical computing resources and/or quantum computing resources, and stored in one or more data stores of a data storage service offered by a provider network. In some embodiments, after execution of the algorithm, the algorithm execution management system may also cause the classical and/or quantum computing resources to be released.

Figure 9:
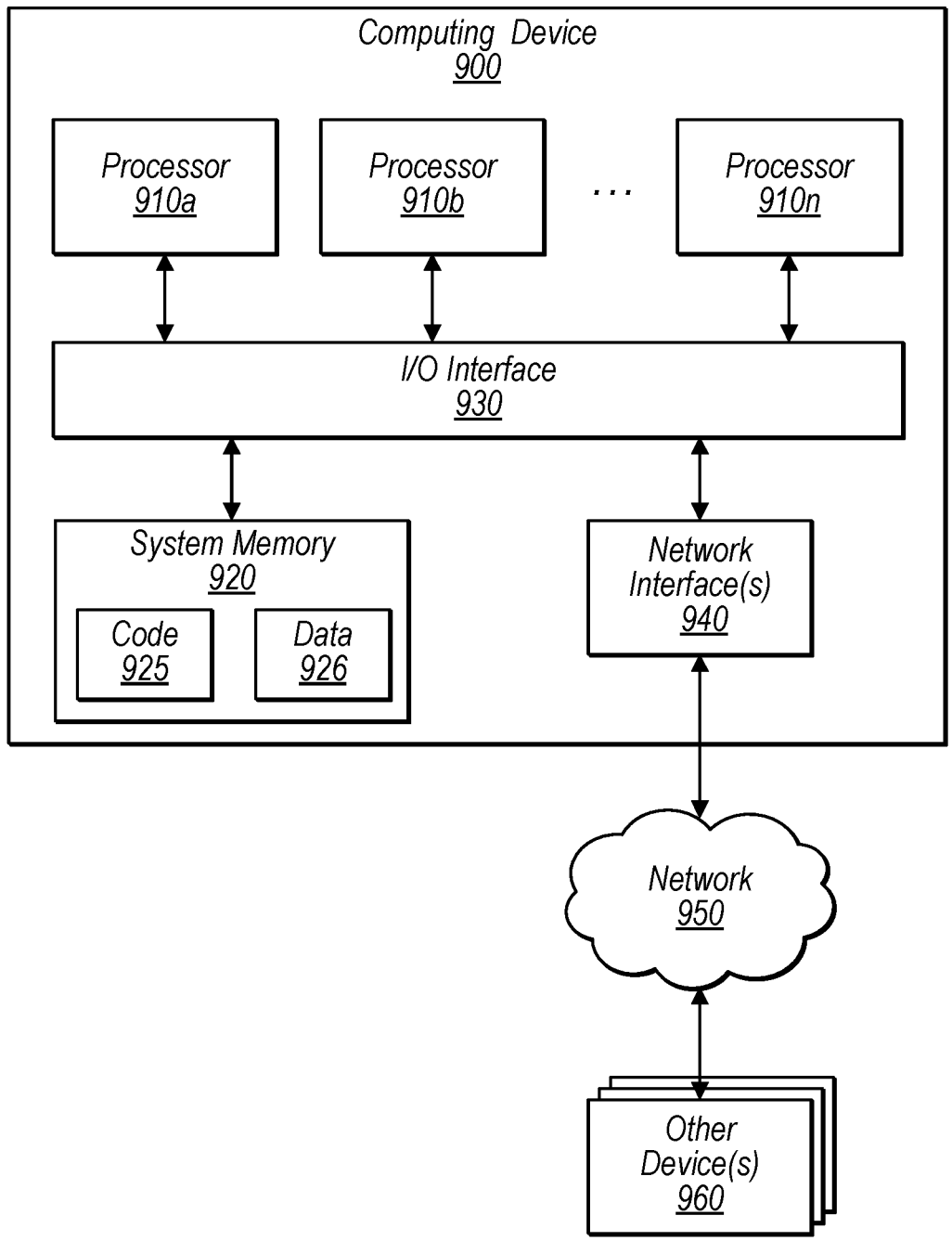
FIG. 9 is a block diagram showing an example computing device to implement the various techniques described herein, according to some embodiments.

FIG. 9 shows an example computing device to implement the various techniques described herein, according to some embodiments. For example, in one embodiment, the algorithm execution management system described above may be implemented by a computer device, for instance, a computer device as in FIG. 9 that includes one or more processors executing program instructions stored on a computer-readable storage medium coupled to the processors. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be one embodiment of a computer-accessible medium configured to store instructions and data accessible by processor(s) 910. In various embodiments, system memory 920 may be implemented using any non-transitory storage media or memory media, such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940. In the illustrated embodiment, program instructions (e.g., code) and data implementing one or more desired functions, such as the algorithm execution management system described above in FIGS. 1-8, are shown stored within system memory 930 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fiber Channel SANs, or via any other suitable type of network and/or protocol.

In some embodiments, system memory 920 may be one embodiment of a computer-accessible medium configured to store program instructions and data as described above for FIG. 1-8. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices comprising at least one processor, the one or more computing devices configured to implement an algorithm execution management system, wherein the algorithm execution management system is configured to:
receive, from one or more users, a request for creating a first container of an algorithm to include a code of the algorithm and one or more libraries for executing the algorithm at classical computing resources and a request for creating a second container of another algorithm to include a code of the other algorithm and one or more other libraries for executing the other algorithm at the classical computing resources, wherein the first and second containers are portable software packages executable using an operating system provided by a shared host hosting the first and second containers;

receive, from the one or more users, one or more other requests for executing the algorithm and the other algorithm using different types of computing resources including a classical computing resource and a quantum computing resource, wherein the one or more other requests indicate the first container of the algorithm and the second container of the other algorithm;

execute at least one portion of the algorithm at the classical computing resource using the first container having the code for the algorithm and the one or more libraries and execute at least one portion of the other algorithm at the classical computing resource using the second container having the code for the other algorithm and the one or more other libraries;

execute at least another portion of the algorithm at the quantum computing resource and execute at least another portion of the other algorithm at the quantum computing resources; and provide a result of the execution of the algorithm generated from at least one of the classical computing resource or the quantum computing resource and provide a result of the execution of the other algorithm generated from at least one of the classical computing resource or the quantum computing resource.

2. The system of claim 1, wherein the first and second containers are created using a container provided by the one or more users of the algorithm execution management system without using a container provided by a provider network as part of which the algorithm execution management system is executed.

3. The system of claim 1, wherein the first and second containers are created based on a container provided by a provider network as part of which the algorithm execution management system is implemented.

4. The system of claim 1, wherein the algorithm execution management system is implemented as part of a provider network that provides the one or more users access to the different types of computing resources, and wherein the result of the execution of the algorithm and the other algorithm are stored in a data store that is implemented as part of a data storage service offered by the provider network.

5. A method, comprising:

receiving, via an interface of an algorithm execution management system that is implemented using one or more computing devices, a request for creating a first container for an algorithm and a request for creating a second container for another algorithm;

receiving, via the interface of the algorithm execution management system, one or more other requests for executing the algorithm and the other algorithm using different types of computing resources including one or more classical computing resources and one or more quantum computing resources, wherein the one or more other requests indicate the first container having one or more files of the algorithm and one or more libraries for executing the algorithm and indicate the second container having one or more files of the other algorithm and one or more other libraries for executing the other algorithm, wherein the first and second containers i-s-a portable software packages executable using an operating system provided by a shared host hosting the first and second containers;

executing at least one portion of the algorithm at the classical computing resources using the first container having the files of the algorithm and the one or more libraries and executing at least one portion of the other algorithm at the classical computing resources using the second container having the files of the other algorithm and the one or more other libraries;

executing at least another portion of the algorithm at the quantum computing resources and executing at least another portion of the other algorithm at the quantum computing resources; and providing a result of the execution of the algorithm and providing a result of the execution of the other algorithm.

6. The method of claim 5, wherein the method further comprises:

prior to executing the algorithm and the other algorithm at the classical computing resource and the quantum computing resources, determining whether the quantum computing resources are available to execute the algorithm and the other algorithm, wherein executing the algorithm and the other algorithm at the classical computing resource and the quantum computing resources comprises:

responsive to determining that the quantum computing resources are available to execute the algorithm and the other algorithm, causing the classical computing resources to be provisioned;

executing the at least one portion of the algorithm at the classical computing resources using the first container having the files of the algorithm and the one or more libraries and executing the at least one portion of the other algorithm at the classical computing resources using the second container having the files of the other algorithm and the one or more other libraries; and executing the at least another portion of the algorithm at the quantum computing resources and executing the at least another portion of the other algorithm at the quantum computing resources.

7. The method of claim 5, further comprising:

providing a priority to a quantum task of the algorithm or the other algorithm over quantum tasks of additional algorithms for using the quantum computing resources.

8. The method of claim 5, wherein:

prior to receiving the other request for executing the algorithm, receiving, via the interface of the algorithm execution management system, the request for creating the first container for the algorithm.

9. The method of claim 8, wherein the first and second containers are created by one or more users of the algorithm execution management system.

10. The method of claim 8, wherein the first and second containers are created using a container provided by a provider network as part of which the algorithm execution management system is implemented.

11. The method of claim 5, wherein the one or more other requests further specify a type of the one or more quantum computing resources for executing the algorithm and the other algorithm.

12. The method of claim 5, further comprising:
storing the result of the execution of the algorithm and the results of the execution of the other algorithm in one or more data stores that are implemented as part of a provider network.

13. The method of claim 5, further comprising:
releasing at least one of the classical computing resources or the quantum computing resources after the execution of the algorithm or the other algorithm.

14. One or more non-transitory computer readable media storing program instructions that when executed on or across one or more processors, cause the one or more processors to:
receive, at an algorithm execution management system, a request for creating a first container for an algorithm and a request for creating a second container for another algorithm;
receive, at the algorithm execution management system, one or more other requests for executing the algorithm and the other algorithm using different types of computing resources including one or more classical computing resources and one or more quantum computing resources, wherein the one or more other requests indicate a first container having one or more files of the algorithm and one or more libraries for executing the algorithm at the classical computing resource and a second container having one or more files of the other algorithm and one or more other libraries for executing the other algorithm at the classical computing resource, wherein the first and second containers i-s-a are portable software packages executable using an operating system provided by a host hosting the container;
execute at least one portion of the algorithm at the classical computing resources using the first container having the files of the algorithm and the one or more libraries and execute at least one portion of the other algorithm at the classical computing resources using the second container having the files of the other algorithm and the one or more other libraries;
execute at least another portion of the algorithm at the quantum computing resources and execute at least another portion of the other algorithm at the quantum computing resources; and
provide a result of the execution of the algorithm and provide a result of the execution of the other algorithm.

15. The one or more non-transitory computer readable media of claim 14, wherein the program instructions further cause the one or more processors to:
prior to executing the algorithm and the other algorithm at the classical computing resource and the quantum computing resources, determine whether the quantum computing resources are available to execute the algorithm and the other algorithm,
wherein to execute the algorithm and the other algorithm at the classical computing resource and the quantum computing resources comprises, the program instructions cause the one or more processors to:
responsive to determining that the quantum computing resources are available to execute the algorithm and the other algorithm, cause the classical computing resources to be provisioned;
execute the at least one portion of the algorithm at the classical computing resources using the first container having the files of the algorithm and the one or more libraries and execute the at least one portion of the other algorithm at the classical computing resources using the second container having the files of the other algorithm and the one or more other libraries; and
execute the at least another portion of the algorithm at the quantum computing resources and execute the at least another portion of the other algorithm at the quantum computing resources.

16. The one or more non-transitory computer readable media of claim 14, wherein the first and second containers are created by one or more users of the algorithm execution management system.

17. The one or more non-transitory computer readable media of claim 14, wherein the first and second containers are created based a container provided by a provider network as part of which the algorithm execution management system is implemented.

18. The one or more non-transitory computer readable media of claim 14, wherein the program instructions further cause the one or more processors to:
provide a priority to a quantum task of the algorithm or the other algorithm over quantum tasks of additional algorithms for using the quantum computing resources.

19. The one or more non-transitory computer readable media of claim 14, wherein the one or more other requests further specify a type of the one or more quantum computing resources at which the algorithm or the other algorithm are executed.

20. The one or more non-transitory computer readable media of claim 14, wherein the program instructions further cause the one or more processors to:
store the result of the execution of the algorithm and the results of the execution of the other algorithm in one or more data stores that are implemented as part of a provider network.

* * * * *